United States Patent Office 3,430,438
Patented Mar. 4, 1969

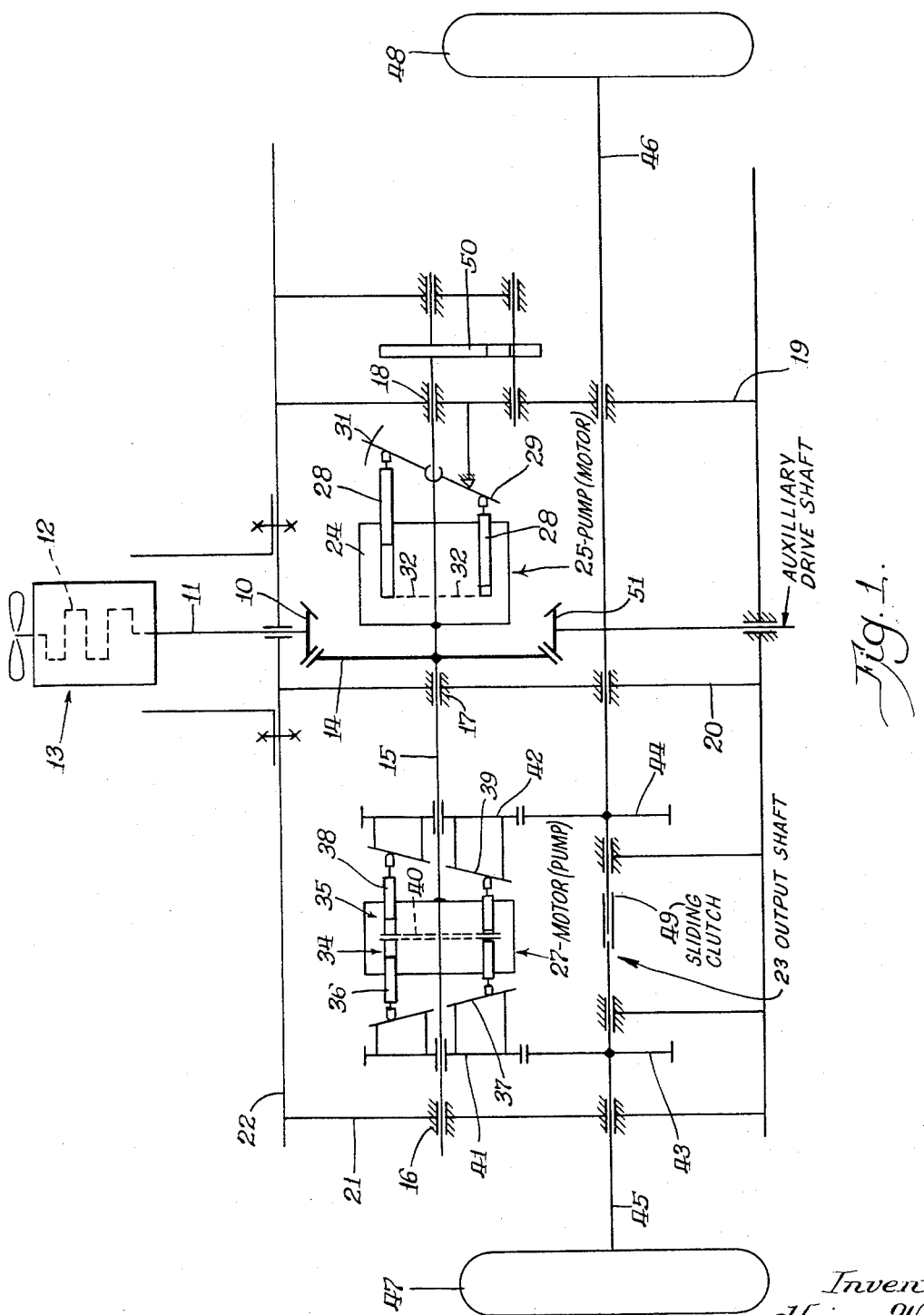

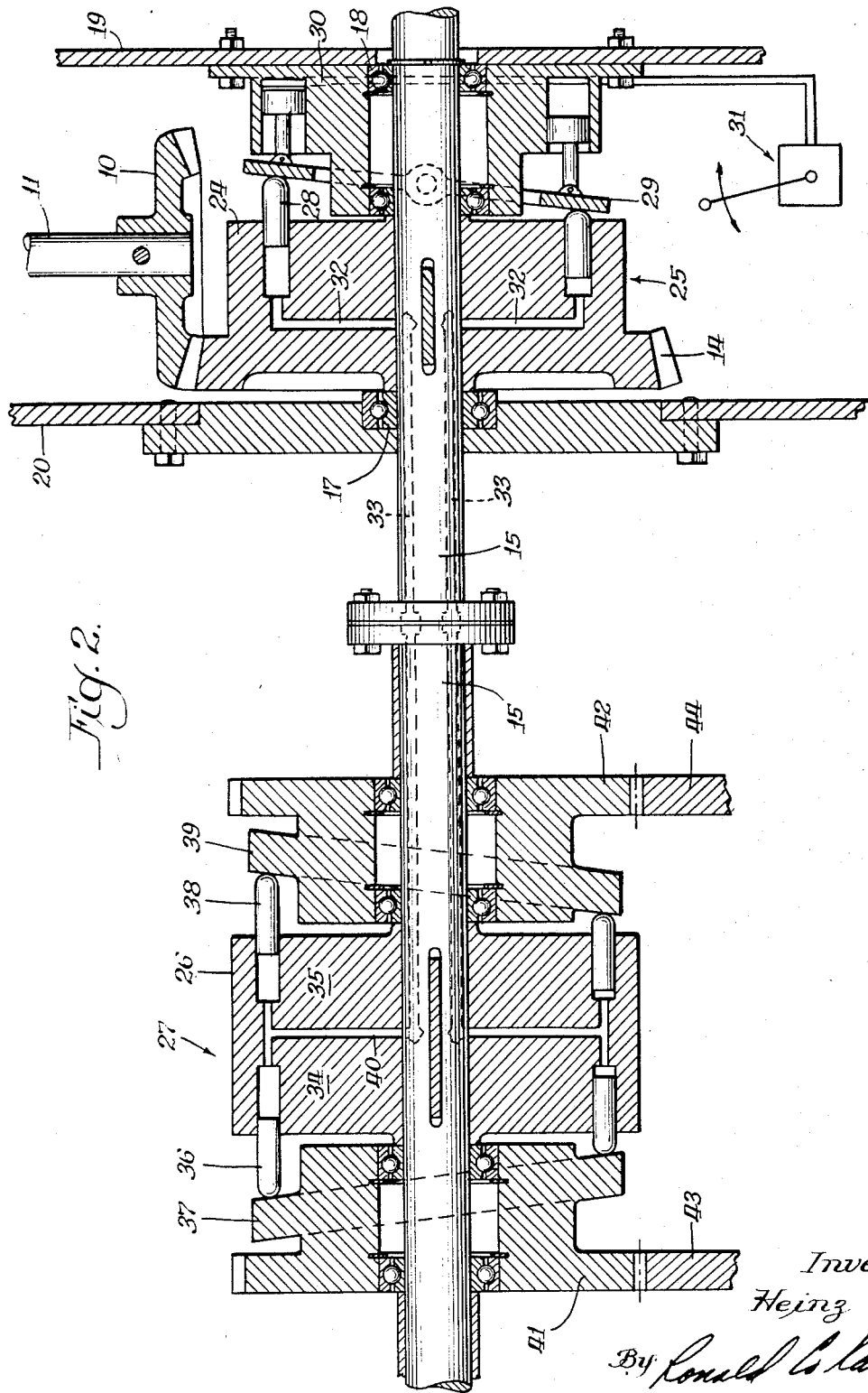

3,430,438
INFINITELY VARIABLE HYDROMECHANICAL
TRANSMISSION
Heinz Weiss, Anrath, Germany, assignor to International Harvester Company, Chicago, Ill., a corporation of Delaware
Filed Aug. 4, 1967, Ser. No. 658,449
U.S. Cl. 60—53                                7 Claims
Int. Cl. F16h *39/14, 39/46*

ABSTRACT OF THE DISCLOSURE

A hydromechanical transmission of the hydraulic-differential type having a variable-displacement hydraulic pump which has a rotatable housing driven by a power input shaft. The wobble plate or rotor of the pump is stationary, so that there is a differential speed between the housing and the stationary wobble plate which will produce an output flow. A drive shaft, which has fluid passageways therein to accommodate fluid output and input flow, connects the pump housing to a rotatable housing of a positive displacement hydraulic motor having dual rotatable wobble plates or power output rotors, which are respectively connected to each end of a split output shaft for driving the traction wheels of a vehicle. The output flow of the pump causes the dual motor rotors to run at a differential speed relative to their housing. Since the motor housing is also rotating at a differential speed to its dual rotors there is an output flow produced back to the pump which restores a portion of the hydraulic power to a mechanical component at the pump.

Background of the invention

Essentially, there are two simple forms of the hydraulic-differential type of transmission; the split-torque and the split-speed. This invention is a version of the split-torque hydraulic-differential transmission. In the split-torque transmission, as shown in U.S. Patent No. 3,131,539, Creighton et al., May 5, 1964, the hydraulic pump and motor rotors are connected to each other and to the power input shaft, the pump housing is stationary whereas the motor housing is free to rotate relative to its rotor and is connected to the output shaft. In the split-speed transmission, as shown in U.S. Patent No. 2,984,070, Bauer, May 16, 1961, the pump housing is free to rotate and is connected to the power input shaft, the motor housing is stationary, and the pump and motor rotors are connected to each other and to the output shaft.

One of the disadvantages of the prior hydraulic-differential types of transmission is that one of the housings rotates which complicates the hydraulics of the systems. Fluid conductors must be attached through rotating unions or similar conductors to permit fluid flow between the housings. Another disadvantage is that the power output from the hydraulic motor still must be coupled to a differential transmission in order to drive the traction wheels of a vehicle.

Summary of invention

This invention differs over the above mentioned prior transmissions in that the pump and motor housings are both rotatable and are connected to one another and to the input shaft for rotation therewith. The drive shaft connecting the housings is provided with fluid passageways thereby eliminating rotating unions or similar connectors to permit fluid flow between the housings. The dual motor rotor arrangement functions as a differential unit thereby eliminating the customary differential transmission which is necessary to drive the traction wheels in prior transmissions.

A further feature of this invention is that both of the dual hydraulic motor units have axial pistons which engage with the surface of a pair of angularly-set wobble plates journalled on the drive shaft. The chambers of the pistons are hydraulically connected with the chambers of the pistons in the hydraulic pump through passageways in the drive shaft. The displacement of the pump is varied by angularly adjusting the stationary pump wobble plate. The two motor wobble plates are each respectively mounted to a gear journalled on the drive shaft. Each of the gears meshes with a gear mounted on each part of a dual output shaft, and each part of the dual output shaft is respectively connected to one of the traction wheels of the vehicle. A differential lock for the drive wheels can be obtained by coupling together the two parts of the output shaft through a sliding clutch.

A special housing for the unit can be eliminated by installing the hydraulic pump and motor, as well as the component parts for the displacement adjustment of the pump in the drive wheel housing or transverse axle, thus making possible a further simplification of the transmission.

Description of the drawings

FIGURE 1 is a schematic illustration of the preferred embodiment of the invention;

FIGURE 2 illustrates vertical sectional view of the hydraulic pump, the drive shaft, and the dual rotor hydraulic motor.

Description of the preferred embodiment

With reference to the drawings there is provided a conical pinion 10 which is driven by a power input shaft 11 extending in the longitudinal direction of the vehicle and is connected with the crankshaft 12 of the vehicle engine 13. The pinion 10 rotates according to the engine speed. A change-speed ratio transmission can be intercalated between the crankshaft and the pinion to bridge the ratios of the hydraulic transmission. Pinion 10 meshes with a bevel ring gear 14 constrained or keyed for rotation with the drive shaft 15 which extends transversely with respect to the longitudinal axis of the vehicle. This drive shaft 15 is supported by suitable bearings 16, 17 and 18 in the partition walls 19, 20 and 21 of an axle housing generally designated 22 for the drive wheels 47 and 48 of the vehicle. The rotary housing 24 of the hydraulic pump 25 and the rotary housing 26 of the hydraulic motor 27 are both constrained or keyed for rotation with the transverse shaft 15. Both of the rotary housings rotate together with equal speed.

The pump 25 is designed as axial piston pump. It features several axial pistons 28 annularly arranged within the rotary housing 24 and supported at their outer sides by a stationary wobble plate 29 or the rotor of the pump which is carried in a bearing retainer 30 affixed to the wall 19 of the axle housing 22. According to the delivery volume of the pump 25 desired, the stationary wobble plate 29 can be adjusted by a lever arrangement generally designated 31. The inner sides of the axial pistons 28 are connected with the passageways 33 within the transverse drive shaft 15 by means of the radial passageways or lines 32 in the housing 25.

The motor 27 is positioned at the opposite side of the bevel ring gear 14 and features within its housing 26 two identical control or motor units 34 and 35. The motor unit 34 has several axial pistons 36 annularly arranged within the common rotary housing 26 and supported at their outer side by a rotatable wobble plate 37 or the rotor of the motor unit 34 of set-angular displacement. The other motor unit 35 has correspondingly arranged axial pistons 38 the outer sides of which are adjacent to a further rotatable wobble plate 39, or the rotor of the motor unit 35, of the same set-angular displacement of the other motor unit. The inner sides of both the motor units or control units respectively are connected with the passageways 33 in the drive shaft 15 by means of radial connecting lines or channels 40 so that both the motor units 34 and 35 are, with regard to the pump 25, hydraulically connected in parallel.

The two rotatable motor rotors or wobble plates 37 and 39 are each respectively connected to one gear of a pair of gears 41 and 42 journally mounted on the transverse drive shaft 15 and said gears are in constant mesh with gears 43 and 44 respectively mounted to the split output shafts 45 and 46 which are each respectively connected to the load or wheels 47 and 48. The output shaft, generally designated 23, is split between the two gears 43 and 44 resulting in two comparable output units or stub shafts 45 and 46. The two shaft stubs 45 and 46 can, with regard to the drive, be connected or disconnected by a sliding clutch 49.

During operation the power train starting from the bevel ring gear 14 proceeds on the one hand over shaft 15 to the rotary housing 26 of the hydraulic motor 27 so that the rotary housing rotates with a certain speed rate. On the other hand, the second power train proceeds over shaft 15 to the rotary housing 24 of the hydraulic pump 25. Here, this mechanical power will be transformed to hydraulic power, the fluid under pressure being channelled to the two motor units 34 and 35 through the radial connection lines 32 in the pump body 24 via the passageways 33 in the drive shaft 15 and into the radial connecting lines 40 in the motor housing 27. The operation of the axial pistons 36 and 38 within the rotating motor body 26 by means of the fluid under pressure effectuates at the two wobble plates 37 and 39 a superimposition of the rotating speeds deriving from the mechanical and hydraulical power train. When the pump 25 is adjusted to the motor range, part of the power hydraulically returns from the hydraulic motor 27, now functioning as pump, to the pump 25 now taking over the function of a motor. Thus, not only the rotating speed "Zero" but also negative rotating speeds can be obtained in the dual output shaft 23 since the rotating speeds become subtracted from the mechanical and the hydrostatic power train.

When during curve driving operation for example, the left hand vehicle drive wheel 47 is more loaded than the right hand wheel 48 a pressure increase in the piston cylinders of motor unit 34 is produced. Since the fluid under pressure tries to take the way where the lowest resistance is exerted the efficiency of the pistons 38 of the motor unit 35 will be increased, i.e. the piston stroke cycle will be accelerated. Thus, the differential effect desired will be obtained. This will also become effective when the "Zero delivery stage" of the hydraulic pump is obtained as opposed to the motor unit of the less decelerated wheel the motor unit of the motor decelerated wheel will take over the function of a pump.

Since the hydraulic motor unit 27 simultaneously takes over the function of the differential transmission the sliding clutch 49 on the dual output shaft 23 can be used as a simple differential lock.

In this context, a feed pump 50 could advantageously be mounted to the stubs of the transverse drive shaft 15 for maintaining the hydraulic circuit and for compensating leakage losses as well as for providing the circuit with sufficiently cooled pressure fluid. Further pumps can easily be driven in addition. Furthermore, it is possible to install at the side of the bevel ring gear 14, opposite to the conical pinion 10, a pinion 51 co-acting with gear 14 and operating an auxiliary drive, e.g. the PTO-shaft of an agricultural tractor.

The example of operation described herewith in detail allows various changes within the scope of the patent claims. Thus, it is understood to be able to replace axial piston pump and motor by other motor and pump versions. But the transmission of power could also be effected in quite another way as featured here.

What is claimed is:

1. In a hydromechanical transmission comprising a power input shaft, a hydraulic pump having a rotatable pump housing and a stationary pump member, a hydraulic motor having a rotatable motor housing and dual motor rotors rotatable relative to the motor housing, a drive shaft mechanically connecting the pump housing to the motor housing, fluid passageways in the pump and motor housings and in the drive shaft hydraulically connecting the hydraulic pump to the hydraulic motor in operable relation, a dual power output means having one end portions thereof each respectively connected to one portion of each dual motor rotor, and load means connected to the other end portions of the dual power output means.

2. In a hydromechanical transmission according to claim 1 wherein said dual motor rotors are journally mounted on said drive shaft on opposite sides of said motor housing.

3. In a hydromechanical transmission according to claim 1 wherein said stationary pump member is an angularly-adjustable wobble plate for varying the displacement of the hydraulic pump, and said dual motor rotors each include angularly-set wobble plates.

4. In a hydromechanical transmission according to claim 3 wherein said angularly-set wobble plates are each journally mounted on said drive shaft on opposite sides of said motor housing.

5. In a hydromechanical transmission according to claim 4 further including a drive gear connected to each of said angularly-set wobble plates, a driven gear for each drive gear and in mesh therewith and each driven gear connected to each of the one end portions of the dual output means.

6. In a hydromechanical transmission according to claim 5 further including a clutch means for coupling each of the one end portions of the dual output means to one another.

7. In a hydromechanical transmission according to claim 6 further including a driver bevel gear connected to the input shaft and a driven bevel gear in mesh with the driver bevel gear and being connected on the drive shaft.

References Cited

UNITED STATES PATENTS

| | | | |
|---|---|---|---|
| 3,123,975 | 3/1964 | Ebert | 60—53 |
| 3,131,580 | 5/1964 | Forster | 60—53 XR |
| 3,157,995 | 11/1964 | Swift | 60—53 |
| 3,371,479 | 3/1968 | Yapp et al. | 60—53 XR |

EDGAR W. GEOGHEGAN, *Primary Examiner.*

U.S. Cl. X.R.

74—650